Aug. 22, 1950

F. X. NAGL 2,519,783

ELECTROCUTING TRAP

Filed Nov. 20, 1948

INVENTOR.
FRANK X. NAGL
BY
Louis V. Lucia
ATTORNEY.

Aug. 22, 1950   F. X. NAGL   2,519,783
ELECTROCUTING TRAP
Filed Nov. 20, 1948   2 Sheets-Sheet 2
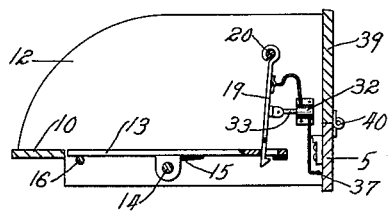
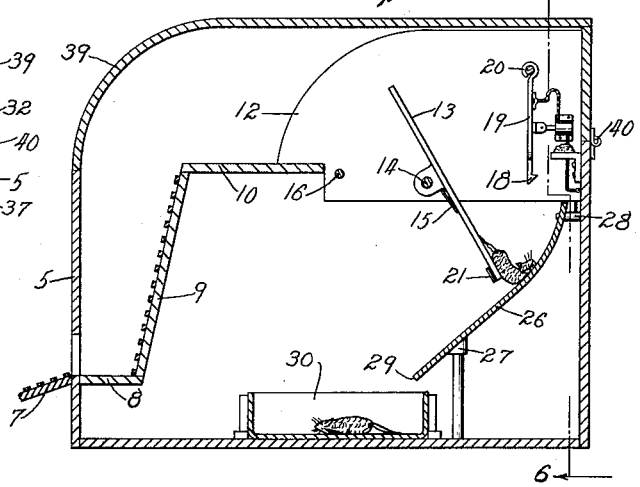
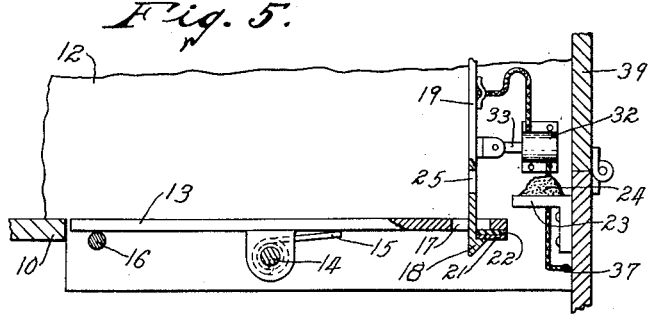
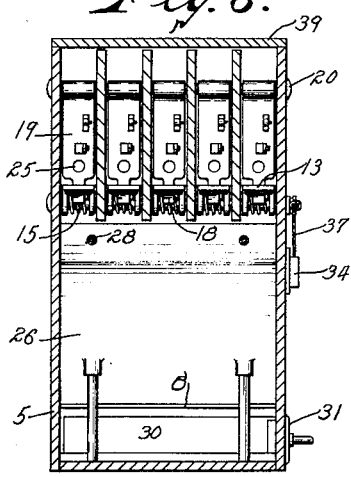
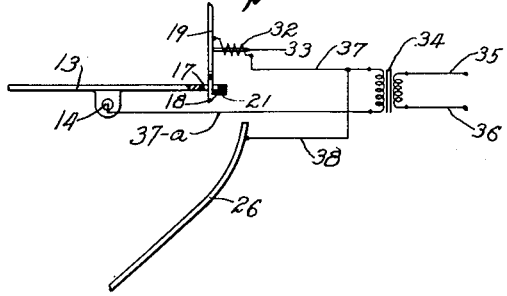
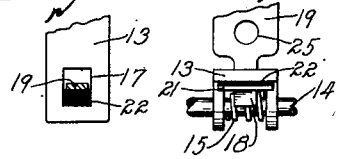
INVENTOR.
FRANK X. NAGL
BY
Louis V. Lucia
ATTORNEY.

Patented Aug. 22, 1950

2,519,783

UNITED STATES PATENT OFFICE 2,519,783

ELECTROCUTING TRAP

Frank X. Nagl, Hartford, Conn.

Application November 20, 1948, Serial No. 61,210

6 Claims. (Cl. 43—99)

This invention relates to an electrocuting trap and more particularly to traps for electrocuting rats.

An object of the invention is to provide such a device having suitable mechanism for electrocuting rats and accumulating them in a container from which they may be later discharged.

A further object of the invention is to provide such a device having a plurality of rat receiving compartments, each adapted to separately receive a rat and deliver it to the electrocuting means of said device.

A still further object of the invention is to provide a mechanism which is adapted to administer a sudden shock to the rat and stun it previously to delivering it to the electrocuting means.

A still further object of the invention is to provide a rat trap in which bait is employed to attract the rats and lure them into one of the receiving chambers, and in which the bait is positioned so as to prevent the rat from coming into contact therewith and leaving a scent which would warn the succeeding rats and cause them to avoid the receiving compartments.

Further objects and advantages of this invention will be more clearly understood from the accompanying drawing in which:

Fig. 3 is a fragmentary sectional side view illustrating the mechanism of a receiving compartment and showing the same in an unlatched position.

Fig. 4 is a sectional side view illustrating the operation of said device.

Fig. 5 is an enlarged side view similar to Fig. 3 but illustrating the mechanism in normal position.

Fig. 6 is a sectional rear view on line 6—6 of Fig. 4.

Fig. 7 is a diagrammatic view illustrating the electrocuting circuit in my improved rat electrocuting device.

Fig. 8 is an enlarged fragmentary plan view of a portion of a receiving platform used in said rat electrocuting device.

Fig. 9 is an enlarged fragmentary front view of the operating latch and platform contained in each of the chambers.

Figure 1:
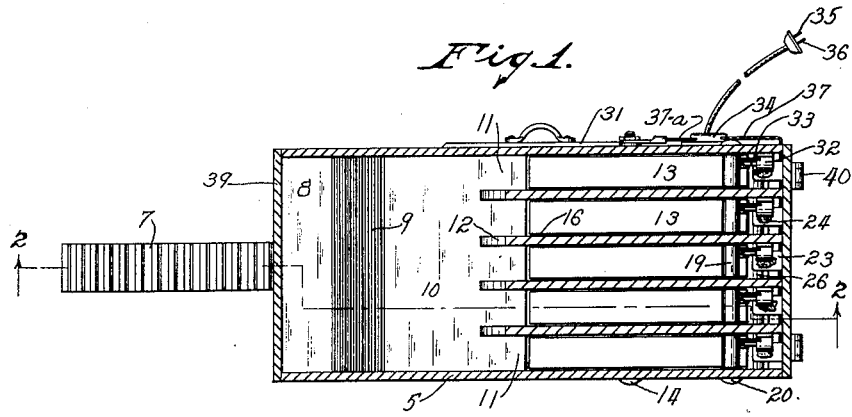
Fig. 1 is a sectional top view of my improved rat electrocuting device on line 1—1 of Fig. 2.

As illustrated in the drawings, my improved rat electrocuting device is preferably constructed to provide a housing 5 having a bottom, a front and rear wall, and side walls.

The front wall of said housing has an entrance opening 6 therein and a ramp 7 is provided to lead into said opening. In the interior of the housing, there is provided a platform 8 having an angular wall 9 leading upwardly therefrom which is provided with a series of steps forming an approach to an upper platform 10. The said platform 8, the wall 9 and the platform 10 extend the entire width of the housing 5.

The upper platform 10 extends into a plurality of receiving compartments 11 which are divided by walls 12 and each of which has a floor comprising a floor plate 13 of electrical conducting material, preferably copper. Each of the said floor plates is pivotally mounted on a common bar 14 which extends across the housing, and a spring 15 is provided under each plate for biasing its respective plate into normal position against a stop bar 16. The front portion of each plate has an opening 17 therein adapted to receive a hook 18 on a latch plate 19 of electric conducting material, preferably copper, which is pivotally supported in each compartment on a common bar 20. The hook 18 engages a detent strip 21 which is insulated from the floor plate 13 by means of an insulated strip 22.

In front of each of the latch plates, there is provided a shelf 23 to support a bait material 24 such as cheese or the like for luring rats and causing them to operate the electrocuting mechanism. Each of said latch plates is provided with an opening 25 in register with the bait and which is only large enough to receive the snout of a rat so as to prevent the rat from reaching the bait.

Below the front portion of the floor plates 13, there is provided a contact plate 26 of an electrical, conducting material such as copper, which is supported upon insulating members 27 and 28 and extends across the entire width of the housing. The lower edge 29 of the contact plate overlies a receptacle 30, preferably in the form of a drawer 31, which opens through the side of the casing 5.

As diagrammatically illustrated in Fig. 7, an electric circuit is provided to cause operation of the said rat electrocuting device and electrocution of the rats. The said electric circuit includes a solenoid 32 in each of the compartments having a push plunger 33 connected to its respective latch plate 19. The said electric circuit also includes a transformer 34 for providing a high voltage to cause electrocution of the rat, The said transformer is connected at the low voltage side to a convenient electric supply by means of conductors 35 and 36, and at the high voltage side it is connected from one side by a conductor 37 through each of the solenoids 32 to the latch plates 19, and from the other side to the floor plates 13 through the conductor 37-a and the bar 14.

Figure 2:
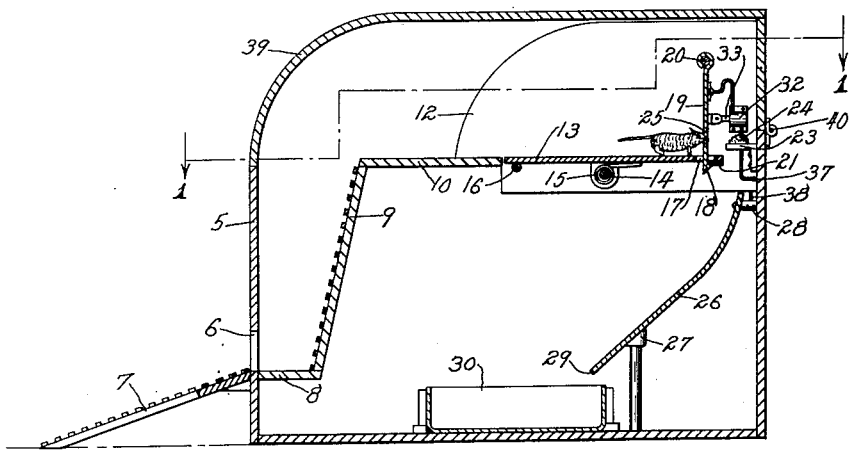
Fig. 2 is a sectional side view of line 2—2 of Fig. 1.

The operation of my improved rat electrocuting device is as follows: A rat entering the case 5 will climb up the inclined wall 9 onto the upper platform 10 leading to the separate compartments. It will then be attracted by the bait and walk into one of the said compartments to a position upon the floor plate 13 as illustrated in Fig. 2 wherein the said rat will place his snout in the opening 25 in the latch plate 19 in an attempt to reach the bait material 24. As the rat contacts the edges of the said opening with his snout, an electric circuit will be closed from the transformer 34 through the solenoid 32, the latch plate 19, the said rat, and the floor plate 13. This will cause operation of the solenoid to push the latch plate towards the rat to the position illustrated in Fig. 3. Movement of the latch plate towards this position will produce a sharp blow against the snout of the rat providing a positive electrical contact and causing the delivery of a high voltage shock which will stun the rat. At the same time, the hook 18 will become disengaged from the detent 21 to release the floor plate 13 and cause the said plate to swing downwardly under the weight of the rat as illustrated in Fig. 4. This will cause the rat to slide from the floor plate into contact with the plate 26 and thus complete the electrical circuit between the floor plate and the contact plate thereby permitting the high voltage current to pass through the rat. The rat is killed by this shock and is then delivered into the receptacle 30. The spring 15 will then return the floor plate to normal position where the hook 18 will again engage the detent 21 and render mechanism ready for operation by a succeeding rat.

It will be noted that as the rat drops away from the latch 19, the circuit through the solenoid 32 will be broken so that the hook is permitted to return to normal position preparatory to receiving the detent 21 upon the return of the floor plate to its normal position.

To facilitate access to the interior of the rat electrocuting device, the housing is provided with a cover 39 which is hinged at 40 so that, when the said cover is open, all of the receiving chambers will be exposed for cleaning or renewing the bait material.

By providing a plurality of receiving chambers, my improved rat electrocuting device permits a rat to find a receiving chamber which has had sufficient time to be rid of any scent from the preceding rat so that the entering rat will not be warned and discouraged from entering a receiving chamber.

I claim:

1. A rat electrocuting trap of the character described comprising a compartment having a movable metal floor, a pivotally mounted metal plate extending across said compartment perpendicularly to said floor and having an opening therein, means for supporting a bait material adjacent to one side of said opening and out of reach therethrough by a rat at the opposite side of the opening, an insulated latching connection between said plate and floor, a solenoid for operating said plate to disengage said connection, and an electric circuit having one side thereof connected through said solenoid to said plate and the other side thereof connected to said floor.

2. A rat electrocuting trap of the character described including a compartment having a movable metal floor plate, a pivotally mounted metal latch plate extending across said compartment and perpendicularly to said floor plate and having an opening therein, bait supporting means positioned adjacent said opening and behind said latch plate, a hook on said latch plate insulated from and engageable with said floor plate, an electrocuting contact plate disposed below the said floor plate, a solenoid for operating the latch plate and an electric circuit having one side thereof connected to the floor plate and the other side thereof connected to said latch plate and said contact plate whereby a rat, standing on said floor plate and attempting to reach said bait through said opening, will close the electric circuit between the floor plate and the latch plate and cause operation of the solenoid to disengage the hook from the floor plate and cause the said floor plate to drop under the weight of the rat and then permit engagement of the rat with the contact plate to close the circuit between the floor plate and the said contact plate and cause electrocution of the rat.

3. A rat electrocuting trap of the character described comprising a housing having a compartment therein, a movable metal floor plate in said compartment, a pivotally mounted latch member of electric conducting material in said compartment; the said latch member being disposed perpendicularly to said floor and having an opening therein, means between said floor plate and latch member providing an electrically insulated connection for supporting said floor plate, a support for a bait material located adjacent to and spaced from said opening, an electric solenoid for moving said latch member in a direction away from said bait material to break the said connection and thereby release the said floor plate, and an electric circuit having one side thereof connected to said floor plate and the other side thereof to said latch plate whereby a rat, standing on said floor plate and attempting to reach the bait material through the said opening, will close said circuit with its body and cause energization of said solenoid and operation of the said latch member to simultaneously render a blow against the snout of the rat, apply an electric shock to stun the rat and release the floor plate to permit it to drop the rat through the bottom of said compartment.

4. An electric rat trap of the character described comprising a housing having a compartment therein, a movable metal floor plate and a pivotally mounted latch member of electrically conducting material in said compartment, the said latch member being disposed perpendicularly to the said floor member and located adjacent to one end of said floor member and having an opening therein, means providing an electrically insulated connection between said latch member and floor plate and supporting the floor plate in a horizontal position, means supporting a bait material adjacent to said opening at the side of said latch member opposite to the floor plate, a solenoid for operating the said latch member in a direction away from the said bait material, a contact plate positioned below the said floor plate, a container located below said contact plate and a high voltage electric circuit having one side thereof connected to said floor plate and the other side thereof connected to said latch plate and said contact plate whereby upon a rat standing on said floor plate and contacting the latch member in attempting to reach the bait material through said opening will close the said circuit with its body and simultaneously cause energization of said solenoid, movement of the latch plate in the direction of the rat to render a blow against the snout of the rat, apply an electric shock to stun the rat and release the floor plate to permit it to drop under the weight of the rat whereupon the rat will contact the contact plate and close the circuit between it and the floor plate and become electrocuted as it slides from the floor plate onto the contact plate in the direction of the said container.

5. A rat electrocuting trap of the character described comprising a housing having a bottom, front and rear walls and an entrance opening in the front wall, a ramp leading to said entrance opening, a lower platform extending across said housing at the level of said entrance, a second platform, positioned above said lower platform and extending across said housing, a ramp between said upper and lower platforms, a plurality of receiving compartments opening onto said upper platform; each of said compartments having therein a pivotally mounted metal floor plate and a pivotally mounted metal latch member having an opening therethrough and a hook at the end thereof extending through an opening in said floor plate, an insulated detent on said floor plate engaging said hook to provide an electrically insulated connection between said floor plate and latch member, a solenoid for operating said latch plate in a direction of the floor plate, a downwardly slanting metal contact plate extending across said housing under said compartments, a container below said contact plate, a cover for said housing extending over said compartments, means for supporting a bait material adjacent to and spaced from said first mentioned opening at the side of the latch plate opposite to the side facing the floor plate, and an electric circuit having one side thereof connected to said latch plate through the solenoid and to the contact plate and the other side thereof connected to the floor plate.

6. An animal electrocuting trap comprising a compartment having a moveable floor plate of electric conducting material, a second moveable plate of electric conducting material positioned in said compartment and having an opening, means for supporting a bait material adjacent the opening in said second plate and on the opposite side thereof from the floor plate, an insulated latching connection between said floor plate and said second plate, a solenoid for moving said second plate towards an animal standing on said floor to thereby break said connection, and an electric circuit having one side thereof connected to said plate through the solenoid and the other side thereof connected to the floor.

FRANK X. NAGL.

REFERENCES CITED

The following references are of record in the file of this patent:

UNITED STATES PATENTS

| Number | Name | Date |
|---|---|---|
| 1,024,969 | Bowen | Apr. 30, 1912 |
| 1,028,435 | Cessna | June 4, 1912 |
| 1,055,645 | Miller | Mar. 11, 1913 |